(12) United States Patent
Kim et al.

(10) Patent No.: US 12,251,652 B2
(45) Date of Patent: Mar. 18, 2025

(54) STRIPPING DEVICE AND STRIPPING METHOD

(71) Applicant: LG CHEM, LTD., Seoul (KR)

(72) Inventors: Seong Hun Kim, Daejeon (KR); Chang Hoe Heo, Daejeon (KR); Sung Keun Jang, Daejeon (KR); Eun Jung Joo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 107 days.

(21) Appl. No.: 17/771,165

(22) PCT Filed: Aug. 20, 2021

(86) PCT No.: PCT/KR2021/011076
§ 371 (c)(1),
(2) Date: Apr. 22, 2022

(87) PCT Pub. No.: WO2022/075581
PCT Pub. Date: Apr. 14, 2022

(65) Prior Publication Data
US 2022/0370930 A1 Nov. 24, 2022

(30) Foreign Application Priority Data
Oct. 5, 2020 (KR) .................. 10-2020-0128021

(51) Int. Cl.
*B01D 3/14* (2006.01)
*B01D 3/32* (2006.01)
(Continued)

(52) U.S. Cl.
CPC .............. *B01D 3/143* (2013.01); *B01D 3/32* (2013.01); *B01D 3/343* (2013.01); *B01D 3/38* (2013.01);
(Continued)

(58) Field of Classification Search
CPC ...... B01D 3/14–24; B01D 3/322; B01D 3/26; C08F 6/001; C08F 6/003; C08F 6/005;
(Continued)

(56) References Cited

U.S. PATENT DOCUMENTS 3,080,354 A * 3/1963 Moon .................... B65G 53/30
406/197
3,151,046 A * 9/1964 Larson ................. C07D 213/06
208/356
(Continued)

FOREIGN PATENT DOCUMENTS

CN 1112938 A 12/1995
CN 1271331 A 10/2000
(Continued)

*Primary Examiner* — Jonathan Luke Pilcher
(74) *Attorney, Agent, or Firm* — Bryan Cave Leighton Paisner LLP

(57) ABSTRACT

The present disclosure relates to a stripping device and a stripping method, and more particularly, to a stripping device including: a distillation column of which at least a part or the entirety of a lower portion is perforated; a stripping vessel integrally connected to the lower portion of the distillation column; and one or more spray nozzles provided at an upper portion of the stripping vessel, and a stripping method using the same.

4 Claims, 2 Drawing Sheets

(51) Int. Cl.
*B01D 3/34* (2006.01)
*B01D 3/38* (2006.01)
*C08F 6/00* (2006.01)
*C08F 6/04* (2006.01)
*C08F 6/24* (2006.01)

(52) U.S. Cl.
CPC ............... *C08F 6/001* (2013.01); *C08F 6/04* (2013.01); *C08F 6/24* (2013.01); *B01D 3/14* (2013.01)

(58) Field of Classification Search
CPC ...... C08F 6/04; C08F 6/06; C08F 6/10; C08F 6/12
See application file for complete search history.

(56) References Cited

U.S. PATENT DOCUMENTS

| | | | |
|---|---|---|---|
| 3,257,372 A * | 6/1966 | Moon | C08F 6/06 159/DIG. 10 |
| 3,349,010 A * | 10/1967 | Plaster | B01D 3/4255 203/99 |
| 3,403,080 A * | 9/1968 | Clay | C08F 6/06 203/84 |
| 3,454,542 A * | 7/1969 | Cheape, Jr. | B01J 19/1881 526/341 |
| 4,068,053 A * | 1/1978 | Miserlis | C08F 10/00 526/68 |
| 4,068,060 A * | 1/1978 | Miserlis | C08F 6/00 526/68 |
| 4,153,787 A * | 5/1979 | Cheape, Jr. | C08F 6/001 524/565 |
| 4,158,092 A | 6/1979 | Botsch et al. | |
| 4,369,092 A | 1/1983 | Nakano et al. | |
| 4,404,064 A | 9/1983 | Lovett | |
| 4,418,191 A | 11/1983 | Irvin | |
| 6,375,793 B1 | 4/2002 | Uchida et al. | |
| 2006/0169416 A1 | 8/2006 | Cowley et al. | |
| 2024/0009590 A1* | 1/2024 | Sleijster | B01D 3/06 |

FOREIGN PATENT DOCUMENTS

| | | |
|---|---|---|
| CN | 1957063 A | 5/2007 |
| CN | 101255109 A | 9/2008 |
| CN | 102186546 A | 9/2011 |
| CN | 102292132 A | 12/2011 |
| CN | 202131147 U | 2/2012 |
| CN | 102600634 A | 7/2012 |
| CN | 106039740 A | 10/2016 |
| CN | 205759899 U | 12/2016 |
| CN | 107557268 A | 1/2018 |
| CN | 108350111 A | 7/2018 |
| CN | 108698961 A | 10/2018 |
| CN | 109078344 A | 12/2018 |
| CN | 109790242 A | 5/2019 |
| CN | 110496576 A | 11/2019 |
| CN | 110582336 A | 12/2019 |
| CN | 110741067 A | 1/2020 |
| GB | 666499 A | 2/1952 |
| JP | H08325321 A | 12/1996 |
| JP | H09-117602 A | 5/1997 |
| JP | 2001-031624 A | 2/2001 |
| JP | 2001-145801 A | 5/2001 |
| JP | 2003-048916 A | 2/2003 |
| JP | 2007-007612 B1 | 1/2007 |
| KR | 10-2003-0018474 A | 3/2003 |
| KR | 10-0928470 B1 | 11/2009 |
| KR | 10-2011-0074743 A | 7/2011 |
| KR | 10-2014-0127200 A | 11/2014 |
| KR | 10-2015-0137024 A | 12/2015 |
| KR | 10-2017-0110095 A | 10/2017 |
| KR | 10-2018-0012545 A | 2/2018 |
| KR | 10-2018-0019721 A | 2/2018 |
| KR | 10-1986367 B1 | 5/2019 |
| KR | 10-1992304 B1 | 6/2019 |
| WO | 2020130397 A1 | 6/2020 |

* cited by examiner

[FIG. 1]
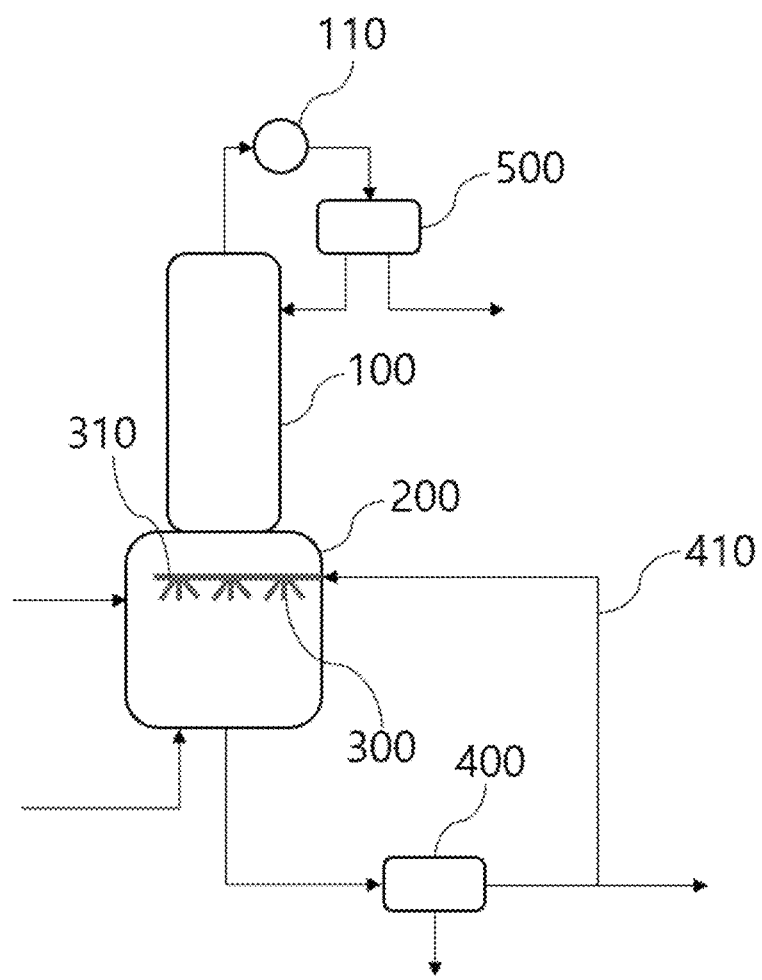

[FIG. 2]
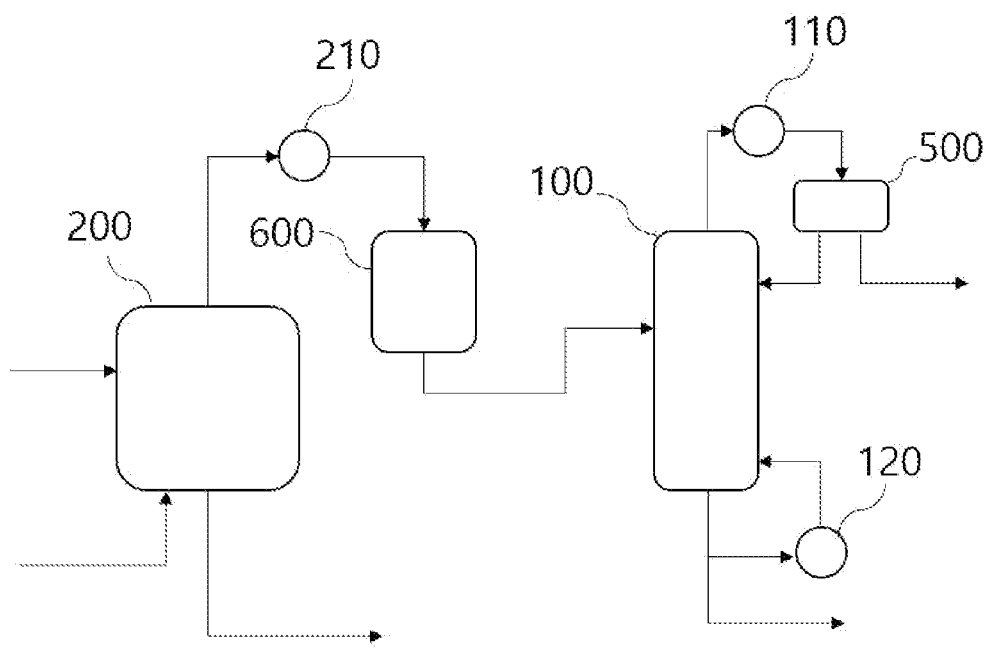
-- RELATED ART --

STRIPPING DEVICE AND STRIPPING METHOD

CROSS-REFERENCE TO RELATED APPLICATION(S)

This application is a National Phase entry pursuant to 35 U.S.C. § 371 of International Application No. PCT/KR2021/011076, filed on Aug. 20, 2021, and claims the benefit of and priority to Korean Patent Application No. 10-2020-0128021, filed on Oct. 5, 2020 in the Korean Intellectual Property Office, the disclosures of which are incorporated by reference in their entirety for all purposes as if fully set forth herein.

TECHNICAL FIELD

The present invention relates to a stripping device and a stripping method, and more particularly, to a novel stripping device and a stripping method capable of improving a removal ratio of an unreacted monomer included in a polymerization reaction product and decreasing a device cost and an energy cost.

BACKGROUND ART

In general, emulsion polymerization or suspension polymerization uses a monomer azeotropic with water, and after the emulsion polymerization or the suspension polymerization, an unreacted monomer remains together with a polymer in a reaction product.

In order to obtain a solid-phase polymer by removing the unreacted monomer from the reaction product, steam including the unreacted monomer and a polymer slurry are separated through a steam stripping process using a stripping vessel and the solid-phase polymer is obtained from the polymer slurry, and the steam including the unreacted monomer is condensed through a heat exchanger and then separated into the unreacted monomer and water through a subsequent distillation process and the unreacted monomer is reused for a polymerization reaction.

In addition, the reaction product of the emulsion polymerization or the suspension polymerization includes additives such as an emulsifier and a dispersant due to reaction characteristics. In a case where high-temperature steam is injected into the stripping vessel in which these additives exist, bubbles are formed, and a fouling phenomenon occurs in a steam transfer line transferring the steam from the stripping vessel to the subsequent distillation process and the heat exchanger due to these bubbles. In a case where such a fouling phenomenon occurs, efficiency of a process is reduced, and thus, the steam transfer line and the heat exchanger need to be periodically cleaned.

Meanwhile, in order to continuously feed the steam separated from the stripping vessel to a subsequent distillation column in a series of processes of removing the unreacted monomer from the reaction product, not only a buffer tank is required, but also a number of devices such as pipes connecting respective components to each other, a pump, and a heat exchanger are required, such that there is a disadvantage that a device cost and an energy cost are increased.

Therefore, a novel stripping device capable of improving efficiency of a process by preventing the fouling phenomenon occurring in the steam stripping process of the reaction product of the emulsion polymerization or the suspension polymerization described above and decreasing the device cost and the energy cost described above needs to be developed.

DISCLOSURE

Technical Problem

An object of the present invention is to provide a stripping device and a stripping method capable of improving efficiency of a process by preventing a fouling phenomenon occurring in a steam stripping process of a reaction product of emulsion polymerization or suspension polymerization and decreasing a device cost and an energy cost.

Technical Solution

According to an embodiment of the present invention, a stripping device includes: a distillation column of which at least a part or the entirety of a lower portion is perforated; a stripping vessel integrally connected to the lower portion of the distillation column; and one or more spray nozzles provided at an upper portion of the stripping vessel.

According to another embodiment of the present invention, a stripping method includes: a step (S10) of feeding a feed stream including a polymer, an unreacted monomer, and water to the stripping vessel of the stripping device according to the present invention and feeding an upper discharge stream including the unreacted monomer and the water to the distillation column; a step (S20) of discharging a lower discharge stream including a polymer slurry from the stripping vessel and feeding the lower discharge stream to a solid-liquid separation device; and a step (S30) of transferring an upper discharge stream including the water from the solid-liquid separation device to the one or more spray nozzles through a water transfer line.

Advantageous Effects

According to the present invention, a novel stripping device and stripping method capable of improving efficiency of a process by preventing a fouling phenomenon occurring in a steam stripping process of a reaction product of emulsion polymerization or suspension polymerization according to the related art and decreasing a device cost and an energy cost may be provided.

DESCRIPTION OF DRAWINGS

FIG. 1 is a view illustrating a structure of a stripping device according to an embodiment of the present invention.

FIG. 2 is a process flow diagram illustrating a stripping process according to the related art.

DETAILED DESCRIPTION

Terms and words used in the present specification and claims are not to be construed as a general or dictionary meaning, and are to be construed as meaning and concepts meeting the technical spirit of the present invention based on a principle that the inventors may appropriately define the concepts of terms in order to describe their own inventions in the best mode.

In the present invention, the term "upper portion" may refer to a portion corresponding to a height of 50% or more from a total height of a container or a device, and the term "lower portion" may refer to a portion corresponding to a height less than 50% from the total height of the container or the device.

In the present invention, the term "slurry" may refer to a mixture of a solid and a liquid or a suspension in which fine solid particles are suspended in water, and the terms "polymer slurry" may refer to a mixture of water or solvent used for a polymerization reaction and a solid content such as a polymer produced by the polymerization reaction or a suspension in which the solid content is suspended in the water or the solvent.

Hereinafter, the present invention will be described in more detail with reference to FIG. 1 in order to help the understanding of the present invention.

In general, emulsion polymerization or suspension polymerization uses a monomer azeotropic with water, and after the emulsion polymerization or the suspension polymerization, an unreacted monomer remains together with a polymer in a reaction product.

In the related art, in order to obtain a polymer by removing the unreacted monomer from the reaction product, steam including the unreacted monomer and a polymer slurry were separated through a steam stripping process using a stripping vessel and the polymer was obtained from the polymer slurry, and the steam including the unreacted monomer was condensed through a heat exchanger and then separated into the unreacted monomer and water through a subsequent distillation process and the unreacted monomer was reused for a polymerization reaction.

In addition, the reaction product of the emulsion polymerization or the suspension polymerization includes additives such as an emulsifier and a dispersant due to reaction characteristics. In a case where high-temperature steam is injected into the stripping vessel in which these additives exist, bubbles are formed, and a fouling phenomenon occurs in a steam transfer line transferring the steam from the stripping vessel to the subsequent distillation process and the heat exchanger due to these bubbles. In a case where such a fouling phenomenon occurs, efficiency of a process was reduced, and thus, the steam transfer line and the heat exchanger needed to be periodically cleaned.

Meanwhile, in order to continuously feed the steam separated from the stripping vessel to a subsequent distillation column in a series of processes of removing the unreacted monomer from the reaction product, not only a buffer tank was required, but also a number of devices such as pipes connecting respective components to each other, a pump, and a heat exchanger were required, such that there was a disadvantage that a device cost and an energy cost were increased.

Therefore, the present invention is to provide a novel stripping device and stripping method capable of improving efficiency of a process by preventing the fouling phenomenon occurring in the steam stripping process of the reaction product of the emulsion polymerization or the suspension polymerization described above and decreasing the device cost and the energy cost described above.

According to the present invention, a stripping device is provided. The stripping device may include a distillation column 100 of which at least a part or the entirety of a lower portion is perforated; a stripping vessel 200 integrally connected to the lower portion of the distillation column 100; and one or more spray nozzles 300 provided at an upper portion of the stripping vessel 200.

According to an embodiment of the present invention, the stripping device according to the present invention may be a device for obtaining a high-purity polymer by removing an unreacted monomer included in a reaction product of a polymerization reaction. In addition, the stripping device according to the present invention may be a device for separating an unreacted monomer from steam including the unreacted monomer azeotropic with water.

According to an embodiment of the present invention, the stripping device may further include a steam inlet provided at a lower portion of the stripping vessel 200 and a feed stream inlet provided at a side surface of the stripping vessel.

High-temperature steam may be fed to the stripping vessel 200 through the steam inlet, and a feed stream may be fed to the stripping vessel 200 through the feed stream inlet. As such, in the stripping vessel 200, a steam stripping process of the feed stream may be performed. The steam stripping process may be a process of separating and removing a gas dissolved in a liquid, and may be performed by, for example, a method such as direct contact by steam, an inert gas, air, or the like, heating, and pressurization, but the present invention is limited thereto.

As a specific example, the removal of the monomer by the steam stripping process performed in the stripping vessel 200 may be performed by separating a solid-phase polymer and the unreacted monomer while moving the unreacted monomer remaining in a solid-phase polymer particle included in the reaction product of the polymerization reaction to liquid-phase water by a diffusion phenomenon, and then discharging a liquid-phase stream including the unreacted monomer as an upper discharge stream of the stripping vessel 200.

As a more specific example, the steam stripping process may be performed through a process in which diffusivity increases by an increase in temperature in the stripping vessel 200 by a heat source contained in the high-temperature steam injected through the steam inlet of the stripping vessel 200 and a process in which a driving force of the diffusion increases by discharging a liquid-phase stream including the unreacted monomer to an upper portion of the stripping vessel 200 to increase a concentration difference in the unreacted monomer between a solid-phase polymer and a liquid phase in the stripping vessel 200.

According to an embodiment of the present invention, the feed stream fed to the stripping vessel 200 may include the reaction product of the polymerization reaction. As a specific example, the feed stream may include a polymer, an unreacted monomer, and water.

For example, the polymerization reaction may refer to a reaction by emulsion polymerization, suspension polymerization, solution polymerization, or bulk polymerization, but is not limited thereto. As a specific example, the polymerization reaction may be a reaction by emulsion polymerization or suspension polymerization.

According to an embodiment of the present invention, the feed stream fed to the stripping vessel 200 may be discharged as an upper discharge stream including an unreacted monomer and water and a lower discharge stream including a polymer slurry from the stripping vessel 200 through the steam stripping process.

The upper discharge stream of the stripping vessel 200 may be fed directly to the distillation column 100. In this case, a heat source generated through a separate heat exchanger 120 (see FIG. 2) according to the related art may be replaced with vaporization heat contained in the upper discharge stream of the stripping vessel 200, such that the separate heat exchanger does not need to be used.

The upper discharge stream of the stripping vessel 200 fed to the distillation column 100 may be discharged as an upper discharge stream including an unreacted monomer and water and a lower discharge stream including water from the distillation column 100 through a distillation process.

The lower discharge stream of the distillation column 100 may be fed directly to the stripping vessel 200. In this case, a concentration of the unreacted monomer in the liquid phase in the stripping vessel 200 is decreased while the water is additionally fed to the stripping vessel 200 in which the removal of the unreacted monomer is performed by diffusion, such that a driving force of the diffusion is increased due to an increase in a concentration difference of the unreacted monomer between the solid-phase polymer and the liquid phase in the stripping vessel 200, and thus, removal efficiency of the unreacted monomer in the lower discharge stream of the stripping vessel 200 including the polymer slurry is improved.

As a specific example, the removal of the monomer by the removal of the unreacted monomer performed in the stripping vessel 200 may be performed by separating the solid-phase polymer and the unreacted monomer while moving the unreacted monomer remaining in the solid-phase polymer particle to the liquid-phase water by the diffusion phenomenon, and then discharging the liquid-phase stream including the unreacted monomer as the upper discharge stream of the stripping vessel 200.

According to an embodiment of the present invention, the stripping device according to the present invention includes the distillation column 100 of which at least a part or the entirety of the lower portion is perforated and the stripping vessel 200 integrally connected to the lower portion of the distillation column 100, such that the number of devices used for a process (see FIG. 2) is reduced as compared with a stripping process according to the related art in which the stripping vessel 200 and the distillation column 100 are independently operated, thereby reducing a device cost and an energy cost.

As a specific example, in a stripping process (see FIG. 2) of a polymer according to the related art, as described above, the upper discharge stream including the gas-phase unreacted monomer and the lower discharge stream including the polymer slurry were separated through the steam stripping process using the stripping vessel 200, and the upper discharge stream of the stripping vessel 200 including the gas-phase unreacted monomer was condensed through a third heat exchanger 210 and then separated into an unreacted monomer and water through the distillation column 100 of a subsequent distillation process.

In this case, a buffer tank 600 was provided in order to feed the upper discharge stream of the stripping vessel 200 including the gas-phase unreacted monomer to the subsequent distillation column 100 and keep a flow rate of the fed upper discharge stream or a pressure in a process system constant. That is, the upper discharge stream of the stripping vessel 200 was stored in the buffer tank 600 and then fed to the distillation column 100 at a constant flow rate.

In addition, the upper discharge stream of the stripping vessel 200 was fed to the distillation column 100, and an upper discharge stream including an unreacted monomer and water and a lower discharge stream including water were discharged from the distillation column 100.

Thereafter, the upper discharge stream of the distillation column 100 was condensed through a first heat exchanger 110 and then fed to a decanter 500, and a water layer stream including a water layer and an organic layer stream including an unreacted monomer were discharged from the decanter 500. Meanwhile, the lower discharge stream of the distillation column 100 was partially branched, heated through a second heat exchanger 120, and then refluxed to the distillation column 100.

As such, in the stripping process of the polymer according to the related art, there was a disadvantage that a device cost is increased because a large number of devices are used, but in a case of the stripping device according to the present invention, the buffer tank 600, the second heat exchanger 120, the third heat exchanger 210, pipes connecting the buffer tank 600, the second heat exchanger 120, the third heat exchanger 210 to each other, and a number of pumps (not illustrated) provided in the pipes, which were essentially used in the related art, are unnecessary, such that there is an effect that a device cost and an energy cost are decreased as compared with the related art.

As such, in order to reduce a high device cost and energy cost generated in the stripping process of the polymer according to the related art, the distillation column 100 and the stripping vessel 200 are integrated with each other in the present invention. However, as described above, in a case where the reaction product of the emulsion polymerization or the suspension polymerization is fed as the feed stream of the stripping vessel 200, bubbles may be formed by high-temperature steam injected into the lower portion of the stripping vessel 200 from the additives such as the emulsifier and the dispersant included in the reaction product.

In a case where the bubbles are included in the upper discharge stream of the stripping vessel 200 and fed to the distillation column 100, the bubbles are not only attached to a tray or a packing of the distillation column 100 to cause fouling, but are also included in the upper discharge stream discharged from the distillation column 100 to cause fouling in the subsequent process. In a case where such fouling occurs, efficiency of the process is reduced, and thus, the distillation column 100 and a subsequent process device need to be periodically cleaned.

In order to solve such a problem, the stripping device according to the present invention may include one or more spray nozzles 300 provided at the upper portion of the stripping vessel 200.

The one or more spray nozzles 300 may serve to suppress formation of the bubbles by spraying a liquid to the bubbles formed in the stripping vessel 200. As a specific example, the liquid sprayed through the one or more spray nozzles 300 may be water, and any liquid capable of suppressing the formation of the bubbles may be sprayed.

As such, the liquid may be sprayed from the one or more spray nozzles 300 provided at the upper portion of the stripping vessel 200 to suppress the formation of the bubbles in the stripping vessel 200, thereby preventing the bubbles from being included in the upper discharge stream of the stripping vessel 200 having an upward flow to the distillation column 100. Therefore, occurrence of a fouling phenomenon in the distillation column 100 and the subsequent process device may be prevented.

According to an embodiment of the present invention, the stripping device according to the present invention may further include a solid-liquid separation device 400 receiving the lower discharge stream of the stripping vessel 200.

The polymer slurry may be separated from the feed stream fed to the stripping vessel 200 and discharged to a lower portion of the stripping vessel 200. The lower discharge stream of the stripping vessel 200 including the polymer slurry is fed to the solid-liquid separation device 400, such that a lower discharge stream including a solid-phase final polymer and an upper discharge stream including water may be discharged.

The solid-liquid separation device may be a device that performs filtration separation such as suction filtration and pressurization filtration, countercurrent extraction, co-current extraction, or centrifugation. As a specific example, the solid-liquid separation device may be a centrifuge.

As such, the lower discharge stream of the stripping vessel 200 is fed to the solid-liquid separation device 400, such that a solid-phase final polymer may be obtained.

According to an embodiment of the present invention, the stripping device according to the present invention may further include a water transfer line 410 connecting the one or more spray nozzles 300 and the solid-liquid separation device 400 to each other.

The upper discharge stream including the water, discharged to an upper portion of the solid-liquid separation device 400 may be transferred to the one or more spray nozzles 300 through the water transfer line 410. That is, the water generated in the stripping process may be used without separately feeding the water sprayed from the one or more spray nozzles 300, and thus, there is an effect of improving efficiency of a process.

The water transfer line 410 may be provided with a flow rate control device (not illustrated) capable of controlling a flow rate and a pressure at which the upper discharge stream of the solid-liquid separation device 400 is fed. As a specific example, the flow rate control device may be a valve or a pump, but is not limited thereto. As a more specific example, the flow rate control device may be a valve.

The stripping device may further include a nozzle pipe 310 for connecting the one or more spray nozzles 300 to the water transfer line 410. As a specific example, the nozzle pipe 310 may have a straight shape, but is not limited thereto.

The spray nozzle 300 may include at least one spray port. In addition, the spray nozzle 300 may be implemented in a spray form including a plurality of spray ports. For example, the number of spray ports of the spray nozzle 300 may be 1 to 5, 1 to 4, or 2 to 4. As a specific example, as illustrated in FIG. 1, the spray nozzle 200 may be implemented in a form including three spray ports.

A spraying pressure of the water sprayed through the spray nozzle 300 may be higher than an operating pressure of the stripping vessel 200 by 0.01 to 0.5 Mpa, or 0.05 to 0.1 Mpa.

The water is sprayed at a pressure within the above range, such that there is an effect of improving removal efficiency of the bubbles formed in the stripping vessel 200 without hindering the upward flow of the upper discharge stream of the stripping vessel 200 fed to the distillation column 100.

According to an embodiment of the present invention, the stripping device according to the present invention may further include a decanter 500 receiving the upper discharge stream of the distillation column 100.

The upper discharge stream of the distillation column 100 may be fed to the decanter 500, separated into a water layer including water and an organic layer including an unreacted monomer from the decanter 500, and then discharged.

In addition, the upper discharge stream of the distillation column 100 may pass through a first heat exchanger 110 and be then fed to the decanter 500. For example, the first heat exchanger 110 may be a condenser. That is, in order to facilitate separation of the water layer and the organic layer from the decanter 500, the upper discharge stream of the distillation column 100 may be condensed in the condenser 110 and then fed to the decanter 500.

A water layer stream discharged from the decanter 500 may be refluxed to the distillation column 100 to improve stripping efficiency of the stripping vessel 200. In addition, an organic layer stream including the unreacted monomer, discharged from the decanter 500 may be fed to a polymerization process, which is a front-end process, to be reused for a polymerization reaction.

The diffusion of the unreacted monomer from the solid-phase polymer into the liquid phase may be mainly influenced by diffusivity and a driving force, which is a difference in concentration between the solid phase and the liquid phase. As a temperature increases, the diffusivity increases, which may be advantageous for diffusion of the unreacted monomer, and as a concentration of the unreacted monomer in the liquid phase becomes lower, the driving force, which is the difference in the concentration described above, becomes larger, which may be advantageous for diffusion of the unreacted monomer.

Since the temperature affects physical properties of the polymer, there is a limit temperature. Therefore, it may be important to keep the difference in the concentration between the solid phase and the liquid phase in the stripping vessel 200 large in order to improve steam stripping. In this case, as described above, the water layer stream discharged from the decanter 500 is refluxed to the distillation column 100, the unreacted monomer included in the water layer stream is separated into the upper discharge stream of the distillation column 100 through a distillation process in the distillation column 100, and the lower discharge stream including the water is then fed to the stripping vessel 200, such that the concentration of the unreacted monomer in the liquid phase included in the stripping vessel 200 may be decreased, and the driving force may be increased accordingly, resulting in improved efficiency of the steam stripping.

According to the present invention, there is a provided a stripping method including: a step (S10) of feeding a feed stream including a polymer, an unreacted monomer, and water to the stripping vessel of the stripping device according to the present invention and feeding an upper discharge stream including the unreacted monomer and the water to the distillation column; a step (S20) of discharging a lower discharge stream including a polymer slurry from the stripping vessel and feeding the lower discharge stream to the solid-liquid separation device; and a step (S30) of transferring an upper discharge stream including the water from the solid-liquid separation device to the one or more spray nozzles through the water transfer line.

The step (S10) may be a step of feeding the feed stream to the stripping vessel 200, separating the feed stream into the upper discharge stream including the unreacted monomer and the water and the lower discharge stream including the polymer slurry through a steam stripping process of the feed stream, and then feeding the upper discharge stream to the distillation column 100.

As a specific example, the upper discharge stream of the stripping vessel 200 may include the gas-phase unreacted monomer and the water.

The step (S20) may be a step of feeding the lower discharge stream of the stripping vessel 200 to the solid-liquid separation device 400 in order to obtain a solid-phase polymer from the lower discharge stream of the stripping vessel 200.

The solid-liquid separation device 400 may separate the polymer and the water from the lower discharge stream of the stripping vessel 200 including the polymer slurry, and discharge an upper discharge stream including the water and a lower discharge stream including the solid-phase polymer.

The step (S30) may be a step of transferring the upper discharge stream including the water from the solid-liquid separation device 400 to the one or more spray nozzles 300 through the water transfer line 410, and may be a step of removing the bubbles formed by injecting the high-temperature steam into the stripping vessel 200 in which the dispersant or the emulsifier included in the feed stream exists as described above or preventing the formation of the bubbles.

A removal ratio of the unreacted monomer of the lower discharge stream of the solid-liquid separation device 400 to the feed stream may be 90% or more, 90 to 100%, or 90 to 95%. That is, in the stripping method using the stripping device according to the present invention, there is an effect that not only the device cost and the energy cost are decreased, but also the removal ratio of the unreacted monomer in a final polymer is improved, as compared with the stripping process according to the related art in which the stripping vessel 200 and the distillation column 100 are independently operated.

According to an embodiment of the present invention, the upper discharge stream including the unreacted monomer and the water may be discharged from the distillation column 100 and fed to the decanter 500, and the water layer and the organic layer including the unreacted monomer may be separated from the decanter 500 and the streams each including the water layer and the organic layer may be then discharged.

In addition, the upper discharge stream of the distillation column 100 may pass through a first heat exchanger 110 and be then fed to the decanter 500. For example, the first heat exchanger 110 may be a condenser. That is, in order to facilitate separation of the water layer and the organic layer from the decanter 500, the upper discharge stream of the distillation column 100 may be condensed in the condenser 110 and then fed to the decanter 500.

The water layer stream discharged from the decanter 500 may be refluxed to the distillation column 100 to improve stripping efficiency of the stripping vessel 200. In addition, the organic layer stream including the unreacted monomer, discharged from the decanter 500 may be fed to a polymerization process, which is a front-end process, to be reused for a polymerization reaction.

The stripping device according to the present invention has been described hereinabove and illustrated in the drawings, but only essential components for understanding the present invention have been described above and illustrated in the drawings, and in addition to the processes and the devices described above and illustrated in the drawings, processes and devices that are not separately described and illustrated may be appropriately applied and used to implement the stripping device and the stripping method according to the present invention.

The invention claimed is:

1. A steam stripping device comprising:
   a distillation column of which at least a part or an entirety of a lower portion is perforated;
   a stripping vessel integrally connected to the lower portion of the distillation column;
   one or more spray nozzles provided at an upper portion of the stripping vessel and configured to spray water;
   a steam inlet provided at a lower portion of the stripping vessel; and
   a feed stream inlet at a side surface of the stripping vessel,
   wherein the feed stream inlet feeds a feed stream including a polymer, an unreacted monomer, and water to the stripping vessel, and
   wherein water is sprayed through the one or more spray nozzles onto bubbles formed in the stripping vessel.

2. The steam stripping device of claim 1, further comprising a solid-liquid separation device for receiving a lower discharge stream of the stripping vessel,
   wherein the solid-liquid separation device is a filter, an extractor, or a centrifuge.

3. The steam stripping device of claim 2, further comprising a water transfer line connecting the one or more spray nozzles and the solid-liquid separation device.

4. The steam stripping device of claim 1, further comprising a decanter for receiving an upper discharge stream of the distillation column.

* * * * *